United States Patent
Lee et al.

(10) Patent No.: US 7,349,708 B2
(45) Date of Patent: Mar. 25, 2008

(54) SYSTEM AND METHOD FOR PROVIDING POSITION INFORMATION

(75) Inventors: Sang-man Lee, Osan-si (KR); Su-hyun Lee, Seoul (KR); Eun-young Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 106 days.

(21) Appl. No.: 10/866,807

(22) Filed: Jun. 15, 2004

(65) Prior Publication Data

US 2005/0009540 A1  Jan. 13, 2005

(30) Foreign Application Priority Data

Jun. 30, 2003 (KR) ............. 10-2003-0043524

(51) Int. Cl.
*H04Q 7/20* (2006.01)
(52) U.S. Cl. .............. 455/456.1; 455/404.2; 455/456.2; 455/456.3; 455/457
(58) Field of Classification Search ........... 455/456.1, 455/456.3, 457, 466, 422.1, 412.1, 456.6, 455/404.2, 412.2, 413, 414.1, 414.2, 456.2
See application file for complete search history.

(56) References Cited

U.S. PATENT DOCUMENTS

| | | | | |
|---|---|---|---|---|
| 5,627,549 | A * | 5/1997 | Park | 701/300 |
| 6,222,483 | B1 * | 4/2001 | Twitchell et al. | 342/357.09 |
| 2002/0034947 | A1 * | 3/2002 | Soliman | 455/436 |
| 2003/0125042 | A1 * | 7/2003 | Olrik et al. | 455/456 |
| 2003/0216145 | A1 * | 11/2003 | Cox et al. | 455/456.1 |
| 2004/0210386 | A1 * | 10/2004 | Wood et al. | 701/208 |
| 2006/0035647 | A1 * | 2/2006 | Eisner et al. | 455/456.1 |

FOREIGN PATENT DOCUMENTS

| | | |
|---|---|---|
| EP | 1 148 754 A3 | 10/2001 |
| JP | 2002-101443 | 4/2002 |
| JP | 2002-512373 | 4/2002 |
| JP | 2002/135827 | 5/2002 |
| JP | 2002-530628 | 9/2002 |
| KR | 2001-0009931 A | 2/2001 |

(Continued)

OTHER PUBLICATIONS

Japanese Office Action dated Apr. 11, 2006.

(Continued)

*Primary Examiner*—Duc M. Nguyen
*Assistant Examiner*—Dai Phuong
(74) *Attorney, Agent, or Firm*—Sughrue Mion, PLLC

(57) ABSTRACT

A system and method capable of providing position information through a data burst message so that a user can use position information without accessing the wireless Internet using a mobile communication terminal. The method including if a position information service for a user of a mobile communication terminal subscribed to the position information service is requested, searching for position information on the relevant terminal in a position information server with position information on a predetermined mobile communication terminal; transmitting the searched position information to a short message service center; and generating a data burst message using the position information received from the short message service center, and transmitting the generated data burst message to the mobile communication terminal.

17 Claims, 6 Drawing Sheets

FOREIGN PATENT DOCUMENTS

| | | |
|---|---|---|
| KR | 2001-0059484 A | 7/2001 |
| KR | 2003-0024460 A | 3/2003 |
| WO | WO 01/60100 A1 | 8/2001 |
| WO | WO 01/86379 A2 | 11/2001 |
| WO | WO 02/080606 A1 | 10/2002 |
| WO | WO 03/009612 | 1/2003 |

OTHER PUBLICATIONS

Office Action dated Dec. 2, 2005—The Patent Office of the People's Republic of China.

* cited by examiner

SYSTEM AND METHOD FOR PROVIDING POSITION INFORMATION

This application claims the priority of Korean Patent Application No. 10-2003-0043524 filed on Jun. 30, 2003, in the Korean Intellectual Property Office, the disclosure of which is incorporated herein in its entirety by reference.

BACKGROUND OF THE INVENTION

1. Field of the Invention

The present invention relates to a system and method for providing position information, and more particularly, to a system and method for providing position information wherein a mobile communication terminal can receive position information from a position information server using a data burst message without accessing the position information server over the wireless Internet, check the current position, and inform a user using another terminal of his/her own position.

2. Description of the Related Art

Interest in a position information service for checking and informing a user of their position via a mobile communication terminal in real time has rapidly increased, among a variety of additional services provided to the user.

That is, a user of a mobile communication terminal can receive weather conditions in their current position and an emergency alarm signal through a predetermined application program installed in the terminal by using current position information provided from a position information service, and can also check a path from the user's current position to their destination.

A method for providing position information services to such a user of a mobile communication terminal is generally classified into a method of using a global positioning system (hereinafter, referred to as "GPS") and a method of using a position information server located at a remote site.

Among them, the GPS method requires that a user should additionally prepare a terminal with a GPS receiver and is a satellite-based position tracking service. Thus, very high service charges are incurred.

Therefore, a method of receiving position information from a position information server has been widely used.

FIG. 1 schematically shows the configuration of a system for providing position information according to a prior art.

As shown in FIG. 1, the system for providing position information according to the prior art comprises a mobile communication terminal 10 capable of accessing a wireless Internet service, and a position information server 30 for collecting position information of terminals registered for the position information service through a home location register (hereinafter, referred to as "HLR") (not shown) or a visited location register (hereinafter, referred to as "VLR") (not shown) and providing the desired terminal with the collected position information.

To receive position information from such a system, a user who uses a mobile communication terminal 10 executes a predetermined application program, accesses the position information server 30 using an application program, and requests his/her own position information from the position information server 30.

The position information server 30 determines whether the mobile communication terminal 10 requesting the position information is a terminal registered for the position information service, and then searches the position information of the relevant terminal 10, and finally transmits the searched position information to the relevant terminal.

The application program installed in the mobile communication terminal 10 downloads position information from the position information server 30 and provides the user with current position information and additional information according to the functions thereof.

According to such a method for providing position information, a user who wishes to receive position information should execute a predetermined application program and access the position information server using the executed application program, if the user intends to obtain position information.

Further, since the application programs that use position information cannot share the position information provided from the position information server, a user should access the position information server through the relevant application program and receive the position information from the server whenever necessary. Further, since the user cannot transmit the received position information directly to another mobile communication terminal, there is inconvenience in that the user should access the position information server, input information on a receiving terminal into the server, and request the desired position information from the server.

Accordingly, there is a need for a method of providing position information wherein position information can be conveniently received from the position information server without accessing the position information server every time over the wireless Internet and the previously received position information can be utilized in a more efficient manner.

SUMMARY OF THE INVENTION

The present invention addresses the aforementioned problems in the prior art. An aspect of the present invention is to provide a system and method capable of providing position information through a data burst message so that a user can use position information without accessing the wireless Internet using a mobile communication terminal.

Another aspect of the present invention is to provide a system and method for providing position information wherein the position information can be efficiently utilized by allowing a user to transmit the position information provided from a data burst message to another mobile communication terminal or to use the position information through another application program.

A further aspect of the present invention is to provide a system and method capable of causing a user to receive position information through a data burst message independent of wireless communication of a mobile communication terminal.

The present invention is configured in such a manner that a position information server searches position information on a predetermined mobile communication terminal in a certain time interval or a specific time and transmits the searched positional information to a short message service center (SMSC), and the short message service center loads the position information received from the position information server in a data burst message and transmits the message to a mobile communication terminal.

When receiving a data burst message from the short message service center, the mobile communication terminal causes a position information processing module to extract position information from the received data burst message and to provide an application processing module with the extracted position information so that current position information can be forwarded to the user or transmitted to another mobile communication terminal.

Further, if the position information does not exist, the mobile communication terminal causes its own position information module to generate a message requesting the transmission of position information to a specific receiving terminal and to transmit the generated message to the specific receiving terminal, thereby transmitting its own position information to the specific receiving terminal through the position information server.

The data burst message contains position information, such as latitude, longitude, and measurement time, transmitted from the position information server. In a case where a short message service (hereinafter, referred to as "SMS") format is applied to the data burst message, a discriminating tag for discriminating a position information message from a general short message will be additionally inserted to the position information message.

Consistent with an aspect of the present invention, there is provided a mobile communication terminal, comprising a position information processing module operable to extract position information in a data burst message and operable to provide the extracted position information; and an application processing module operable to provide current position information to a user based on the provided position information.

Consistent with another aspect of the present invention, there is provided a position information server, comprising means for collecting position information on a predetermined mobile communication terminal, and means for searching and providing position information on the relevant terminal to a user by a data burst message through a short message service center, if a position information service for a specific terminal registered for the position information service is requested Consistent with a further aspect of the present invention, there is provided a method of providing position information, comprising the steps of if a position information service for a user of a mobile communication terminal subscribed to the position information service is requested, searching for position information on the relevant terminal in a position information server with position information on a predetermined mobile communication terminal; transmitting the searched position information to a short message service center; and generating a data burst message using the position information received from the short message service center, and transmitting the generated data burst message to the mobile communication terminal.

Consistent with a still further aspect of the present invention, there is provided a method of providing position information, comprising receiving, by a mobile communication terminal, a data burst message provided from a position information server; if the data burst message is received, extracting position information from the data burst message by executing a position information processing module; and providing current position information to a user through an application processing module by inputting the extracted position information to the application processing module.

BRIEF DESCRIPTION OF THE DRAWINGS

The above and other aspects, features and advantages of the present invention will become apparent from the following description of exemplary embodiments given in conjunction with the accompanying drawings, in which.

DETAILED DESCRIPTION OF THE INVENTION

Hereinafter, a system and method for providing position information consistent with the present invention will be described in detail with reference to the accompanying drawings.

In explaining the configuration and operation of the system for providing position information consistent with the present invention with reference to the accompanying drawings, a position information server transmits predetermined position information in the form of a data burst message through a short message service center (hereinafter, referred to as "SMSC") to a mobile communication terminal. However, it is for illustrative purposes only and it will be understood by those skilled in the art that various changes and other equivalents can be made to the method of transmitting and receiving the position information using a data burst message.

Accordingly, the true technical scope of the present invention should be construed as being defined by the appended claims.

Figure 1:
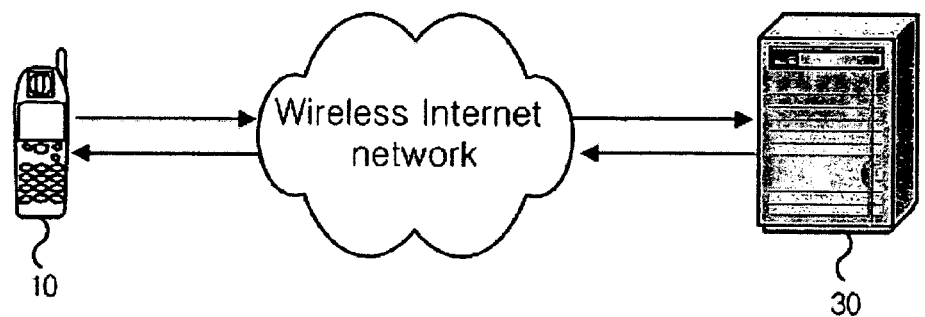
FIG. 1 is a view schematically showing the configuration of a system for providing position information according to the prior art.
Figure 2:
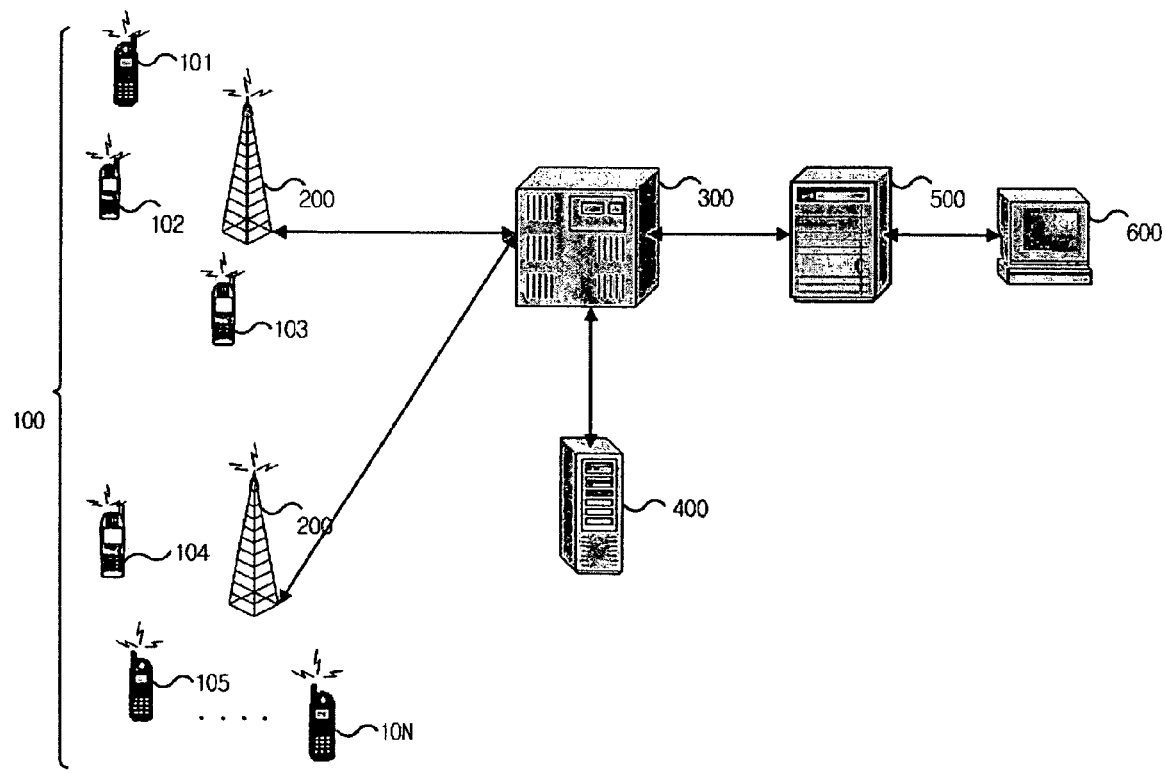
FIG. 2 is a view schematically showing the configuration of a system for providing position information consistent with an embodiment of the present invention.

FIG. 2 schematically shows the configuration of a system for providing position information consistent with an embodiment of the present invention.

Referring to FIG. 2, the system for providing position information the present invention comprises a plurality of mobile communication terminals 101, 102, . . . 10N; a position information server 500 for collecting position information of mobile communication terminals registered for a position information service among the mobile communication terminals 100 from HLR or VLR and providing the collected information to a user through the relevant terminal; and SMSC 400 for generating a data burst message based on the position information received from the position information server 500 and transmitting the data burst message to a designated receiving terminal. The system further comprises a subscriber authentication server 600 for providing a predetermined subscriber with a position information service through the position information server 500, a base station 200 and an exchange 300 for transmitting the data burst message received from SMSC 400 to the designated receiving terminal.

Each of the mobile communication terminals 100 comprise a position information processing module (not shown) for analyzing data burst messages received from the position information server 500 through the base station 200 to extract position information from the analyzed messages and forwarding the extracted position information, and an application processing module (not shown) for providing a user with current position information on the basis of the position information provided from the position information processing module.

Further, when a user requests the transmission of position information on his/her own current position to a specific receiving terminal, the position information processing module determines whether the position information on a current position exists. If it is determined that the position information on the current position is present, the processing module transmits the position information on the current position to SMSC. Otherwise, the processing module transmits a message requesting the position information to the position information server 500 and forwards the position information on the current position to the call number of the specific receiving terminal through the position information server 500.

That is, when a data burst message containing position information is received from the position information server 500, the application processing module that received position information from the position information processing module provides the user with the current position information according to a specific function of the application executed therein.

For example, information on the user's current position and distance to their destination can be checked through a driving information application program for drivers, and information on the weather conditions in the user's current position can also be checked through a weather forecast application program.

In addition, the position information obtained from the position information processing module can be transmitted to another specific terminal using the short message service.

Figure 3:
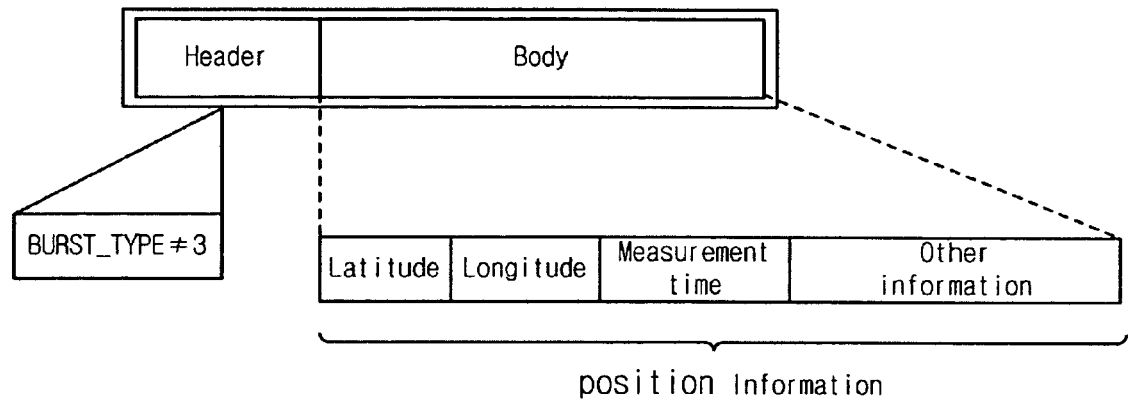
FIG. 3 is a view schematically showing a structure of a data burst message containing position information consistent with an embodiment of the present invention.

FIG. 3 schematically shows the structure of a data burst message consistent with an embodiment of the present invention.

As shown in FIG. 3, the data burst message consists of a header and a body, each of which has a predetermined size in bytes. The header is set to a general data burst message rather than an SMS format (BURST_TYPE≠3), and the body contains position information, such as latitude, longitude and measurement time, transmitted from the position information server.

Such a data burst message can carry position information in the SMS format corresponding to "BURST_TYPE=3". In such a case, a predetermined discriminating tag is added to the data burst message to discriminate a position information message from a general short message.

Figure 4:
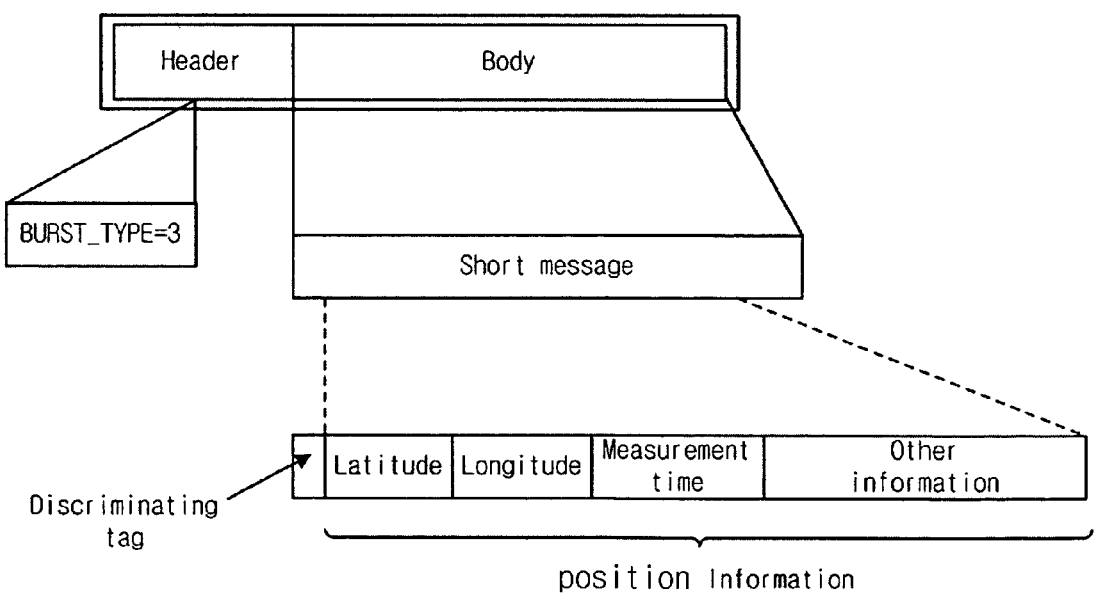
FIG. 4 is a view schematically showing a structure of an SMS data burst message containing position information consistent with another embodiment of the present invention.

FIG. 4 schematically shows the structure of an SMS data burst message consistent with another embodiment of the present invention.

As shown in FIG. 4, the SMS data burst message consists of a header set to "BURST_TYPE=3" and a body, including an SMS part, that contains a discriminating tag and position information such as latitude, longitude, measurement time and other information.

In case of the SMS format, a discriminating tag for discriminating a position information message from a general short message is added to the data burst message containing the position information.

For reference, in the aforementioned system for providing position information consistent with an embodiment of the present invention, all modules may be configured in hardware, some modules in software, or all modules in software.

Therefore, it will fall within a scope and spirit of the present invention that the system for providing position information consistent with the present invention is configured in hardware or software, and it will also be apparent that various changes and modifications can be made thereto without departing from the scope and spirit of the present invention.

Next, the method of providing position information of the present invention using the system so constructed will be described in detail with reference to the accompanying drawings.

The method of providing position information consistent with the present invention comprises the steps of transmitting position information from a position information server 500, which stores position information for a predetermined mobile communication terminal, to any one of mobile communication terminals 100; and transmitting and receiving position information between the mobile communication terminals 100 capable of transmitting the position information to a specific receiving terminal.

The step of transmitting and receiving position information between the mobile communication terminals 100 comprises the steps of causing the mobile communication terminal 100 to transmit the position information received from the position information server 500 to the specific receiving terminal using a short message service (SMS); and causing the position information server 500 to transmit the position information to the specific receiving terminal at the request of the mobile communication terminal 100.

Further, this transmission/reception step further comprises the step of informing a user of their current position through an application processing module by processing the position information received from the position information server 500 in the application processing module.

In explaining the method of the present invention so configured, a process of transmitting the position information form the position information server 500 to the mobile communication terminal 100 will be first discussed, and then, a process of transmitting and receiving the position information between mobile communication terminals 100 will be discussed.

Figure 5:
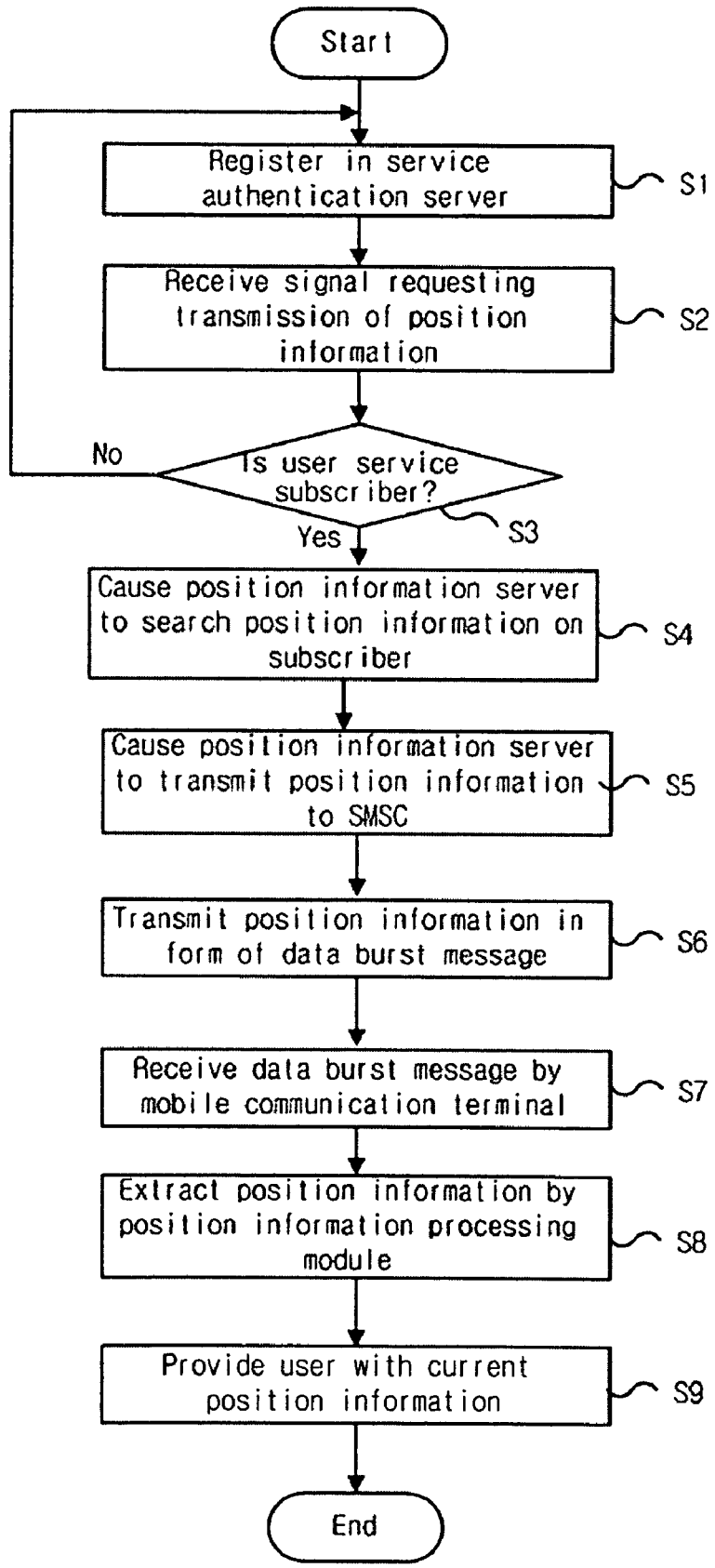
FIG. 5 is a flowchart illustrating a process of transmitting position information from a position information server to a mobile communication terminal consistent with an embodiment of the present invention.

FIG. 5 schematically shows the process of transmitting position information from the position information server 500 to a mobile communication terminal consistent with an embodiment of the present invention.

As shown in FIG. 5, the users of the terminal who wish to receive the position information service through the position information server 500 register at a service authentication server (not shown) for the position information service through the position information server 500 (S1).

In the registration process, each user sets a time interval or a specific time used for receiving position information while registering basic information on his/her own mobile communication terminal.

Then, when the position information server 500 receives a signal requesting position information from a mobile communication terminal 100 (S2), the position information server 500 determines whether the user of the relevant mobile communication terminal 100 is a service subscriber in response to the received signal (S3).

If it is determined that the user is a service subscriber, the position information server 500 searches the position information on the relevant terminal of the service subscriber from the position information on the registered mobile communication terminals collected from HLR or VLR (S4).

Further, the position information server 500 searches the position information on the relevant terminal of the service subscriber when the time set by the service subscriber comes to provide position information service.

The position information server 500 transmits the searched position information to SMSC 400 (S5). Further, the server inputs the relevant terminal number as the call number of the receiving terminal using the registered terminal information and requests SMSC 400 to transmit the position information to the relevant terminal.

SMSC 400 generates a data burst message using the received position information and transmits the generated data burst message to the designated receiving terminal (S6).

When the data burst message is received from SMSC 400 (S7), the mobile communication terminal 100 causes the position information processing module to be executed and to extract the position information from the received data burst message (S8).

Then, when the position information is extracted by the position information processing module, the mobile communication terminal 100 causes a predetermined application processing module to provide a user with their current position information according to the user's selection (S9).

Figure 6:
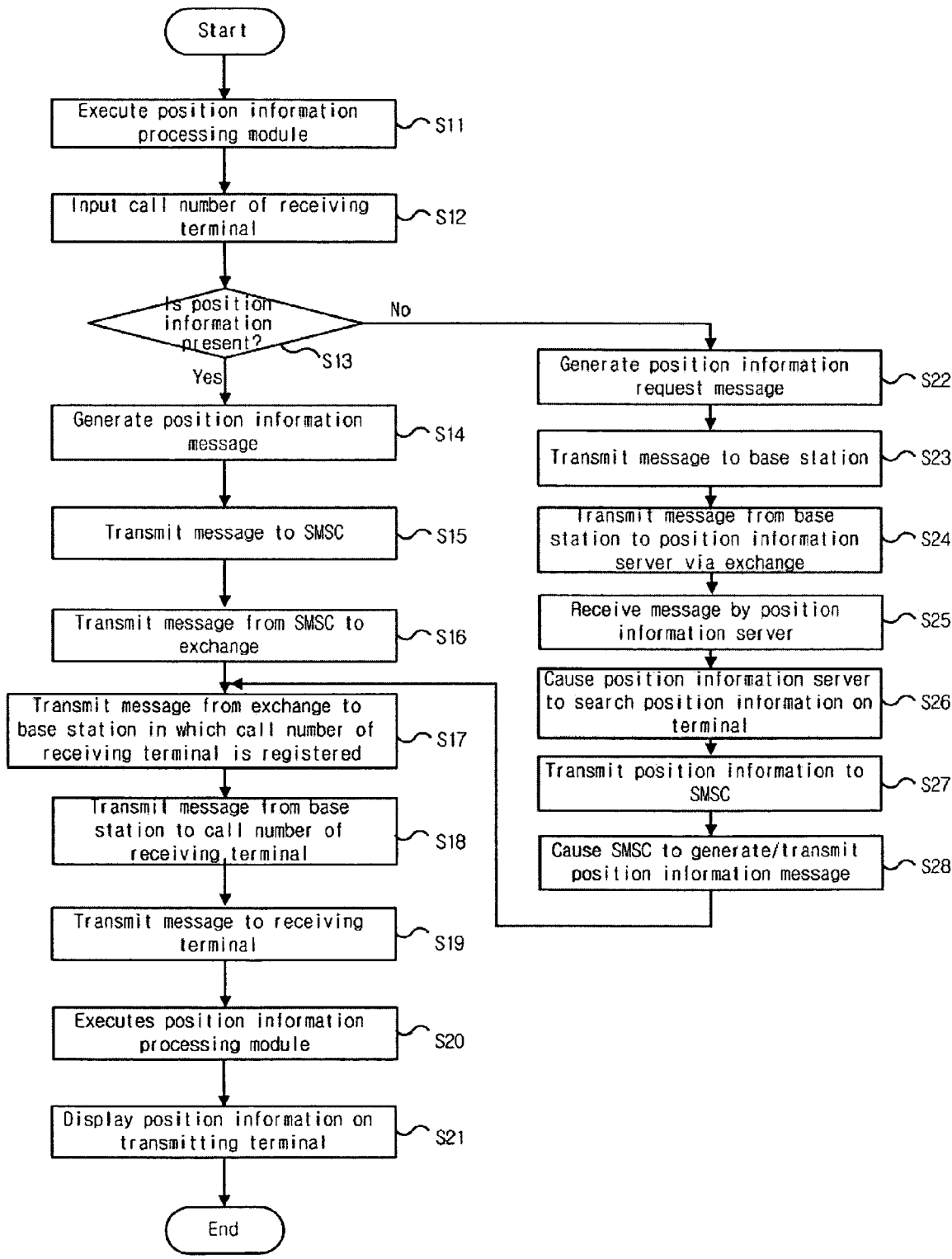
FIG. 6 is a flowchart illustrating a process of causing a mobile communication terminal to transmit and receive position information to and from another mobile terminal consistent with an embodiment of the present invention.

FIG. 6 schematically shows the process of transmitting and receiving position information between mobile communication terminals 100 consistent with an embodiment of the present invention.

As shown in FIG. 6, a predetermined mobile communication terminal 101 first causes its own position information processing module to be executed according to the user's selection (S11).

Then, when the user inputs the call number of a specific mobile communication terminal 105 corresponding to a receiving terminal so as to transmit position information on a current position of the user to the specific mobile communication terminal 105 (S12), the executed position information processing module determines whether the position information on the current position exists in the predetermined mobile communication terminal 101 (S13).

If it is determined that the position information on the current position exists, the position information processing module of the terminal generates a position information message that contains the position information on the current position in the SMS format (S14) and transmits the generated position information message to SMSC 400 (S15).

SMSC 400 transmits the received position information message to an exchange 300 (S16), which in turn transmits the received position information message to a base station 200 in which the position information on the receiving terminal 105 having the relevant call number is registered, according to the information on the reception terminal 105 in the received position information message (S17).

The base station 200 transmits the position information message to the relevant terminal in accordance with the call number of the receiving terminal 105 (S18), and accordingly, the receiving terminal 105 receives the position information message transmitted from the base station 200 (S19).

When the position information message is transmitted from the predetermined mobile communication terminal 101 to the specific mobile communication terminal 105 in such a manner, the mobile communication terminal 105 that has received the position information message causes the position information processing module to be executed and to extract the position information (S20), and causes the current position information of the user who uses the mobile communication terminal 101 to be displayed onto a display module based on the extracted position information (S21).

On the other hand, if it is determined that the position information on the current position does not exist, the position information processing module of the terminal generates a message requesting position information so as to request position information from the position information server 500 (S22), and transmits the generated position information request message to the base station 200 (S23).

The base station 200 transmits the position information request message to the position information server 500 through the exchange 300 (S24), and accordingly, the position information server 500 receives the position information request message from the mobile communication terminal 101 through the exchange 300 (S25).

The position information server 500 determines whether the user of the relevant terminal 101 is a service subscriber in response to the received position information request message, and then searches the position information on the relevant terminal 101 from the position information on the mobile communication terminals 100 of the service subscribers (S26).

Thereafter, the position information server 500 transmits the searched position information to SMSC 400 (S27) and requests SMSC 400 to transmit necessary information to the receiving terminal 105 having the call number designated by the user of the mobile communication terminal 101.

SMSC 400 generates a position information message to be transmitted to the receiving terminal 105 using the received position information and transmits the generated message to the exchange 300 (S28).

The exchange 300 transmits the received position information message to the base station in which the relevant terminal 105 is registered, according to information on the receiving terminal 105 contained in the message (S17), which in turn is transmitted to the relevant terminal 105.

An embodiment of the method of providing position information consistent with the present invention so configured will be described in detail with reference to the accompanying drawings.

Figure 7:
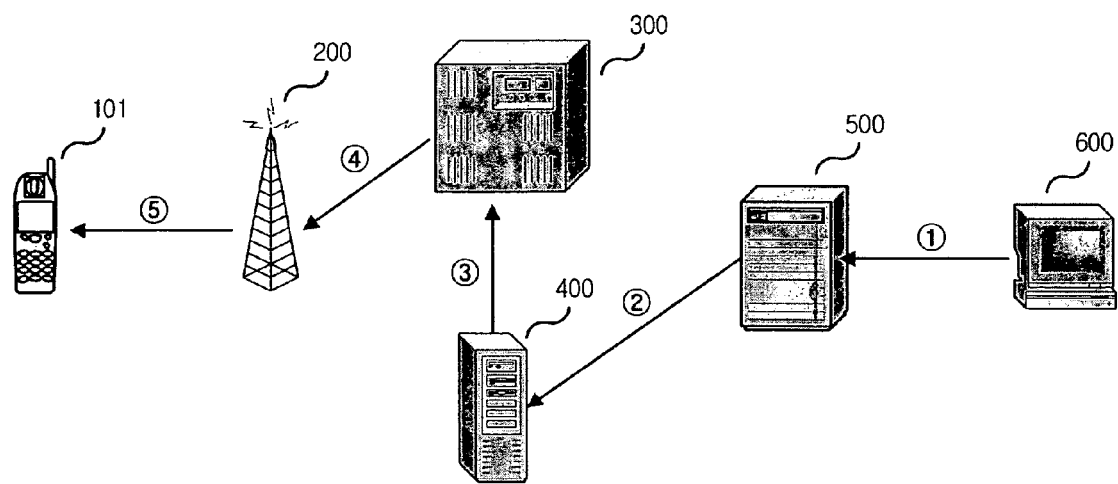
FIG. 7 is a view schematically showing a process of transmitting and receiving a message between a position information server and a mobile communication terminal consistent with an embodiment of the present invention.

FIG. 7 shows the configuration of a system for transmitting position information from the position information server to a mobile communication terminal consistent with an embodiment of the present invention.

As shown in FIG. 7, if a user of a mobile communication terminal 101 has allowed the position information server 500 to inform another terminal of his/her own current position at his/her own request, the position information server 500 checks whether the user is a service subscriber through the subscriber authentication server 600 when a position information request signal is received from the user (①).

If it is determined that the user is a service subscriber, the position information server 500 searches position information on the relevant terminal 101 and transmits the searched position information to SMSC 400 (②).

SMSC 400 generates a data burst message to transmit the received position information to the call number of the receiving terminal 101, which is also transferred from the position information server 500.

Then, SMSC 400 transmits the generated data burst message to the exchange 300 (③), and the exchange 300 transmits the message to the base station 200 in which the position information on the relevant receiving terminal 101 is registered (④).

The mobile communication terminal 101 receives the data burst message from the base station 200 (⑤)). Further, the terminal 101 causes the position information processing module to be executed and to extract position information contained in the received data burst message, and receives its own current position information based on the extracted position information through the application processing module.

Figure 8:
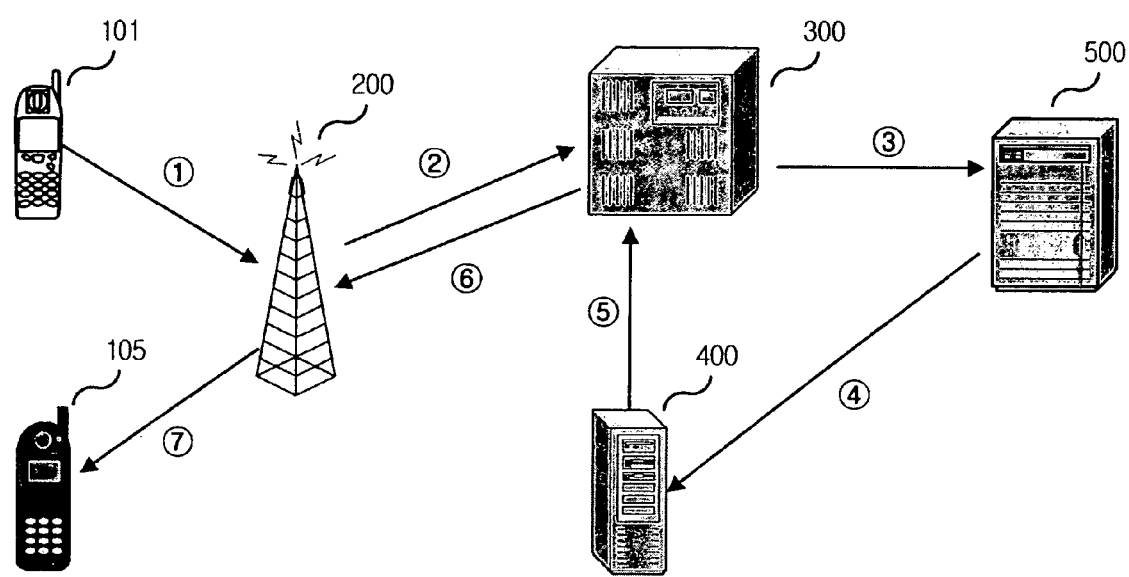
FIG. 8 is a view schematically showing a process of transmitting and receiving position information between mobile communication terminals consistent with another embodiment of the present invention.

FIG. 8 shows the structure of a system for transmitting and receiving position information between mobile communication terminals consistent with another embodiment of the present invention.

As shown in FIG. 8, in a case where the user of a mobile communication terminal 101 who has received his/her own position information through the aforementioned process intends to inform another user of a mobile communication terminal 105 of his/her own current position, the user of mobile communication terminal 101 causes the position information processing module to be executed and to transmit position information on his/her own current position to the other user.

Then, the user inputs the call number of the receiving terminal 105 to which the user wishes to transmit his/her own position information, and causes the position information processing module to determine whether the position information on his/her own current position exists in his/her own terminal.

If the position information on his/her own current position does not exist because the user of mobile communication terminal 101 moves to another location after receiving the position information, the position information processing module of mobile communication terminal 101 generates a position information request message and transmits the generated message to the base station 200 (①).

The base station 200 transmits the received position information request message to the exchange 300 (②), and then, the exchange 300 transmits the message to the position information server 500 (③).

The position information server 500 searches the position information on the relevant terminal 101 in accordance with the received position information request message and transmits the searched position information to SMSC 400 after assigning the call number of a specific reception terminal 105 to the receiving terminal (④).

SMSC 400 generates a data burst message to be transmitted to the specific reception terminal 105 based on the received position information and transmits the generated data burst message to the exchange 300 (⑤).

The exchange 300 transmits the message to the base station 200 in which the relevant terminal 105 is registered, according to the call number of the receiving terminal 105 contained in the received data burst message (⑥).

The base station 200 transmits the received message to the relevant receiving terminal 105 (⑦). Then, when receiving the data burst message from the base station 200, the mobile communication terminal 105 causes the position information processing module to extract the position information from the received data message and obtains the current position information on the user of terminal 101.

Through the aforementioned process, the user of mobile communication terminal 101 can efficiently receive position information from the position information server 500 and transmit the position information received from the position information server 500 directly to another mobile communication terminal 105 or transmit his/her own position information to another mobile communication terminal 105 via the position information server 500.

Consistent with the present invention, the mobile communication terminal can receive position information without accessing the wireless Internet, whereby load on the wireless network can be reduced.

Further, there is an advantage in that the user of a mobile communication terminal can freely receive and utilize position information even while using the terminal.

Furthermore, there is another advantage in that the exchange of position information between mobile communication terminals can be easily performed.

What is claimed is:

1. A mobile communication terminal, comprising:
a position information processing module which extracts position information in a data burst message and provides the extracted position information; and
an application processing module which provides current position information to a user based on the extracted position information,
wherein if transmission of position information on a current position of the user to a specific receiving terminal is requested by the user, the position information processing module determines whether the position Information on the current position exists,
wherein the position information on the current position is transmitted to the specific receiving terminal if it is determined that the position information on the current position exists, and
wherein a position information requesting message is transmitted to the position information server to cause the position information on the current position to be transmitted to the specific receiving terminal if it is determined that the position information on the current position does not exist.

2. The terminal as claimed in claim 1, wherein:
said position information processing module analyzes the data burst message received from a position information server in order to extract the position information.

3. The terminal as claimed in claim 2, wherein, when the position information on the current position is transmitted to the specific receiving terminal, the position information on the current position is transmitted to the call number of the specific receiving terminal though a short message service center.

4. The terminal as claimed in claim 1, wherein the data burst message comprises a body comprising position information comprising latitude, longitude and measurement time transmitted from the position information server.

5. The terminal as claimed in claim 4, wherein if the data burst message is a short message of which BURST_TYPE=3, the data burst message further comprises a predetermined discriminating tag for discrimination from a general short message.

6. The terminal as claimed in claim 1, wherein the application processing module comprises a driving information application module which uses the extracted position information to provide information on a current position of the user and distance to a destination of the user.

7. The terminal as claimed in claim 1, wherein the application processing module comprises a weather forecast application module which uses the extracted position information to provide information on weather condition at a current position of the user.

8. A method of providing position information, comprising:
- if a position information service for a user of a mobile communication terminal subscribed to the position information service is requested, searching for position information on the mobile communication terminal in a position information server with the position information on the mobile communication terminal;
- transmitting the position information to the short message service center; and
- generating a data burst message using the position information received from the short message service center, and transmitting the generated data burst message to the mobile communication terminal,
- wherein if transmission of the position information of the mobile communication terminal to a specific mobile communication terminal is requested by the user, determining, by the mobile communication terminal, whether the position information on the current position exists in the mobile communication terminal, and providing position information on its own current position to the specific mobile communication terminal through the position information processing module, wherein:
- if it is determined that the position information on the current position exists, transmitting the position information on the current position to the specific mobile communication terminal, and
- if it is determined that the position information on the current position does not exist, transmitting a position information requesting message to the position information server and causing the position information of the mobile communication terminal to be transmitted to the specific mobile communication terminal through the position information server.

9. The method as claimed in claim 8, further comprising transmitting, by the position information server, the position information on the terminal to the call number of a designated receiving terminal according to a request from the user of the mobile communication terminal.

10. The method as claimed in claim 8, wherein the data burst message comprises a body comprising position information comprising latitude, longitude and measurement time transmitted from the position information server.

11. The method as claimed in claim 10, wherein if the data burst message is a short message of which BURST_TYPE=3, the data burst message further comprises a predetermined discriminating tag for discrimination from a general short message.

12. A method of providing position information, comprising:
- receiving by a mobile communication terminal, a data burst message provided from a position information server;
- if the data burst message is received, extracting position information from the data burst message by executing a position information processing module;
- providing current position information to a user through an application processing module by inputting the extracted position information to the application processing module; and
- if transmission of position information of the mobile communication terminal to a specific mobile communication terminal is requested by the user, determining, by the mobile communication terminal, whether the position information on the current position exists in the mobile communication terminal, and providing position information on its own current position to the specific mobile communication terminal through the position information processing module, wherein:
- if it is determined that the position information on the current position exists, transmitting the position information on the current position to the specific mobile communication terminal, and
- if it is determined that the position information on the current position does not exist, transmitting a position information requesting message to the position information server and causing the position information of the mobile communication terminal to be transmitted to the specific mobile communication terminal through the position information server.

13. The method as claimed in claim 12, wherein providing the position information on its own current position to the user of the specific mobile communication terminal comprises transmitting the position information on the current position to the call number of the specific mobile communication terminal through a short message service center.

14. The method as claimed in claim 13, wherein when position information is transmitted through the short message service center, data burst message comprises a predetermined tag for discrimination from a general short message and a body comprising position information comprising latitude, longitude and measurement time.

15. The method as claimed in claim 13, further comprising inputting the call number of the specific mobile communication terminal to which the position information on the current position will be sent.

16. The method as claimed in claim 12, wherein the data burst message comprises a body comprising position information comprising latitude, Longitude and measurement time transmitted from the position information server.

17. The method as claimed in claim 16, wherein if the data burst message is a short message of which BURST_TYPE=3, the data burst message further comprises a predetermined discriminating tag for discrimination from a general short message.

* * * * *